US012627153B2

(12) United States Patent
Adamczyk et al.

(10) Patent No.: US 12,627,153 B2
(45) Date of Patent: May 12, 2026

(54) CONTROL OF POWER CONVERTERS IN POWER TRANSMISSION NETWORKS

(71) Applicant: GE Infrastructure Technology LLC, Greenville, SC (US)

(72) Inventors: Andrzej Adamczyk, Stafford (GB); Carl Barker, Stafford (GB); Li Zou, Stafford (GB); Huy Quoc Si Dang, Stafford (GB)

(73) Assignee: GE VERNOVA INFRASTRUCTURE TECHNOLOGY LLC, Greenville, SC (US)

( * ) Notice: Subject to any disclaimer, the term of this patent is extended or adjusted under 35 U.S.C. 154(b) by 183 days.

(21) Appl. No.: 18/677,337

(22) Filed: May 29, 2024

(65) Prior Publication Data

US 2024/0413737 A1 Dec. 12, 2024

(30) Foreign Application Priority Data

Jun. 9, 2023 (EP) ..................................... 23178470

(51) Int. Cl.
H02J 3/36 (2026.01)

(52) U.S. Cl.
CPC ...................................... H02J 3/36 (2013.01)

(58) Field of Classification Search
CPC ................................... H02M 5/40; H02J 3/30
See application file for complete search history.

(56) References Cited

U.S. PATENT DOCUMENTS

2023/0051706 A1* 2/2023 Toi ...................... H02M 7/4835

FOREIGN PATENT DOCUMENTS

EP 4009469 A1 6/2022

OTHER PUBLICATIONS

Extended European Search Report issued in EP Application No. 23178470.3 dated Dec. 4, 2023, 10 pages.
Erlich et al.: Wind turbine negative sequence current control and its effect on power system protection. 2013 IEEE Power & Energy Society General Meeting, Vancouver, BC, Canada, 2013, pp. 1-5, doi: 10.1109/PESMG.2013.6672880.

* cited by examiner

*Primary Examiner* — Alex Torres-Rivera
(74) *Attorney, Agent, or Firm* — Eversheds Sutherland (US) LLP

(57) ABSTRACT

A method of controlling a power converter in a power transmission network. A first amplitude limit value for a first AC current output from an AC side of the power converter is received. A second amplitude limit value for a negative phase sequence component of the first AC current is received. The negative phase sequence component is measured to provide a measured second amplitude. The negative phase sequence component is regulated to flow with a second amplitude that is the lesser of the measured second amplitude and second amplitude limit value. A positive phase sequence component of the first AC current is regulated to flow with an amplitude not exceeding a regulated third amplitude. The third amplitude is set using a function such that the second amplitude and the third amplitude provide a first amplitude for the first AC current that is substantially equal to the first amplitude limit value.

17 Claims, 8 Drawing Sheets

100

140 110 110b 130 120 120b 150

110a 120a

400

410

420

430

440

450

500

CONTROL OF POWER CONVERTERS IN POWER TRANSMISSION NETWORKS

FIELD

The subject matter herein relates generally to the field of power transmission networks and more specifically to the control of power converters in power transmission networks.

INTRODUCTION

In high voltage direct current (HVDC) power transmission networks, alternating current (AC) power is typically converted to direct current (DC) power for transmission via overhead lines, under-sea cables and/or underground cables. This conversion removes the need to compensate for the AC reactive/capacitive load effects imposed by the power transmission medium, i.e. the transmission line or cable, and reduces the cost per kilometre of the lines and/or cables, and thus becomes cost-effective when power needs to be transmitted over a long distance. DC power can also be transmitted directly from offshore wind parks to onshore AC power transmission networks, for instance.

The conversion between DC power and AC power is utilised where it is necessary to interconnect DC and AC networks. In any such power transmission network, power conversion means also known as converters (i.e. power converters in converter stations) are required at each interface between AC and DC power to effect the required conversion from AC to DC or from DC to AC.

The choice of the most suitable HVDC power transmission network or scheme depends on the particular application and scheme features. Examples of power transmission networks include monopole power transmission networks and bipole power transmission networks.

The dynamic exchange of active and reactive power between a power electronic converter interfaced system, such as an HVDC transmission link and the AC power system or grid itself, is primarily governed by a control algorithm employed by the power electronic converter. More specifically, synchronous grid forming (SGFM) control is gaining in interest and popularity owing to its strengthening effect on the stability of the overall power system.

SUMMARY

A typical characterization of SGFM control is to make a power electronic converter behave as a three-phase, positive phase sequence, AC voltage source, that resides behind an impedance. The power electronic converter operates at a frequency that is synchronous with other SGFM sources connected to the same power system. The use of SGFM control brings benefits in scenarios where an AC power system perturbation materializes. In response to such a perturbation, the power electronic converter would inherently exchange transient current that would counteract the voltage and/or frequency change experienced at the point of connection of the converter to the AC power system.

However, unlike other SGFM sources such as synchronous generators, power electronic interfaced systems, including power converters in HVDC converter stations, need to obey much stricter current limits. Hence, SGFM converter control methods and apparatus must not allow steady state or transient currents to exceed these limits. In order to achieve this, SGFM control methods and apparatus must act to modify the output voltage profile of the power converter should a risk of non-compliance with the current limits arise.

An example of a scenario whereby the current limits of a power electronic converter could be exceeded is that of an insulation fault occurring in a connected AC power system. This may result in a relatively large voltage deviation at the point of connection of the power electronic converter and the AC power system. The larger the voltage difference between the point of connection and the voltage behind the converter impedance, the higher the current exchange will be.

A three-phase system is designed to operate as a balanced system comprising only positive phase sequence voltage/current. However, when an AC power system undergoes an asymmetric fault, such as a single-phase to earth fault, a large negative phase sequence voltage component may be introduced and experienced at the converter point of connection to the AC power system. In addition, a substantial reduction of the positive phase sequence voltage component may be experienced. If the converter was to maintain purely the positive phase sequence AC voltage profile, as desired, for instance, in SGFM control modes, the negative and positive phase sequence voltage components resulting from the fault would likely drive large negative phase and positive phase sequence current flows within the circuit. Combined with other current components, this could potentially overload at least a portion of the semiconductor devices within the power converter.

More specifically, with regard to modular, multi-level voltage sourced converters (MMC VSC) that are typically employed in HVDC systems, this unmitigated exchange of negative phase and positive phase sequence AC currents, combined with the DC and converter circulating currents, could overload the transistors (insulated-gate bipolar transistors (IGBT), for instance) in the sub-modules of a converter valve or group of valves.

Therefore, there is a need for a method of controlling a power converter that, under any viable AC grid condition, limits the short and long term amplitude profiles of the AC current, to values acceptable for all power components of the power electronic interfaced system. A challenge arises however, in view of prior art approaches, which independently treat the positive and negative phase sequence components. More specifically, the positive phase sequence component, which governs the power flow during normal operation, is often prioritized. However, the electrical current capability of a power converter is based on the total instantaneous value of the AC currents and valve currents. Put differently, it is the instantaneous sum of all of the electrical current components, that can determine whether a power converter is being overloaded. By way of example, considering the AC current only, the highest instantaneous value an AC circuit element would be exposed to on the converter side of a coupling transformer, would predominantly be the peak of the fundamental frequency current waveform that results from the superposition of the positive and negative phase sequence components. Employing a control algorithm that separately regulates the positive and negative phase sequence components, does not consider this superposition effect, and hence some other process must coordinate the regulation such that the highest resulting total AC current amplitude does not exceed the instantaneous value that would overload the power converter and associated power electronics.

In addition, from an AC network (i.e. a power grid) perspective, the coordination of the regulation of positive and negative phase sequence currents will also affect how the power electronic interfaced system would contribute, during disturbances, towards positive phase sequence voltage amplitude enhancement, versus voltage balancing (i.e. restoring voltage symmetry).

A prior art approach to mitigating these issues is to regulate the flow of the negative phase sequence current to zero through the use of a negative phase sequence current feedback controller. A controller of this type measures the power converter AC current and decomposes said current into sequence components in a manner well understood in the art. Then, the controller determines a desired converter output negative phase sequence voltage to drive the measured negative phase sequence current to zero Amperes. In this way, the controller can employ any viable positive phase sequence current limiting strategy without any need to coordinate with the negative phase sequence control algorithm.

The inventors have realized that whilst this prior art approach obviates the need for coordination of positive phase sequence control with negative phase sequence control, it renders a power electronic interfaced system transient AC output current undesirable from a system perspective. More specifically, the resulting transient AC output current would always be positive phase sequence only, regardless of the type of the AC system fault or disturbance that led to the initial unbalance. As a consequence, the power electronic interfaced system (the power converter) being controlled in a such a manner, would not contribute to voltage balancing during asymmetrical faults. Indeed such a control method would likely cause overvoltage on healthy phases of a multiphase supply during fault events. Hence, such an approach could unnecessarily boost the positive phase sequence voltage amplitude enhancement when it is not needed, whilst ignoring the need to restore voltage symmetry. Furthermore, positive sequence only current injection during asymmetrical faults could cause AC protection systems to operate incorrectly.

An alternative prior art approach to mitigating these issues is to switch the power converter into a current control mode for both positive and negative phase sequences when an overcurrent condition is detected. This control method involves sampling current and resolving the current into positive and negative phase sequence components. Then, by superposition, the controller executing the control method determines the largest peak value of the converter output AC current that would result from such symmetrical current components. Finally, based on a difference between this value and a predetermined limit value for the output AC current, the controller determines a reduction factor to apply, equally, to both the positive and negative phase sequence components. These scaled quantities then become the reference for the controller. By driving the output AC current to these references, the largest peak value amongst any one of the phases in a multi-phase system should be equal to the targeted AC peak limit value.

The inventors have realized that whilst this prior art approach tends to guarantee the safe operation of a power electronic converter, whilst providing some negative phase sequence current in addition to positive phase sequence current, a problem arises during asymmetrical AC system faults/disturbances, where the approach may still negatively impact AC system voltage profiles and protection systems. This is because, on first activation of the current limiting control method, the apparent positive and negative phase sequence currents at that instant in time are being used to determine the reference values for future current limiting.

The initial step of resolving the measured AC current to symmetrical sequence components (positive and negative phase components, for instance) is burdened with delay and initial calculation errors. Thus, such first impression current references may not be beneficial values from an AC system stability perspective. By way of example, it may follow that the initial current references exacerbate voltage imbalance at the point of connection of the power converter to an AC power grid. This could turn into a positive feedback situation, locking the power converter into a sustained undesirable AC current response through the entire AC system disturbance duration. The risk of such a response is increased for weak AC systems, where the power converter AC output would have the dominant impact on the voltage profile at the point of connection. This is particularly relevant given that greater use of SGFM control is stemming from decreasing voltage stiffness of AC grids (i.e. grids becoming progressively weaker).

Hence, it is desirable to provide a method of controlling a power converter that mitigates these issues.

According to a first aspect of the invention, there is provided a computer-implemented method of controlling a power converter in a power transmission network, the power converter having an alternating current (AC) side electrically connected to an AC network at a point of connection, the method comprising: receiving a first amplitude limit value for a first AC current, the first AC current being output from the AC side of the power converter; receiving a second amplitude limit value for a negative phase sequence component of the first AC current, wherein the second amplitude limit value is less than or equal to the first amplitude limit value; measuring the negative phase sequence component of the first AC current to provide a measured second amplitude; regulating the negative phase sequence component to flow with a regulated second amplitude by: if the measured second amplitude is less than the second amplitude limit value, setting the regulated second amplitude to be equal to the measured second amplitude; if the measured second amplitude is equal to or greater than the second amplitude limit value, setting the regulated second amplitude to be equal to the second amplitude limit value; regulating a positive phase sequence component of the first AC current to flow with an amplitude not exceeding a regulated third amplitude by: setting the regulated third amplitude as a function of the first amplitude limit value and the regulated second amplitude, such that the regulated second amplitude and the regulated third amplitude, when combined, provide a first amplitude for the first AC current that is substantially equal to the first amplitude limit value.

The inventors have found a solution that tends not to limit the flow of positive and negative phase sequence currents in all circumstances, but moreover restricts their respective amplitudes in extreme cases to dynamically calculated limits. More specifically, the regulated second amplitude of the negative phase sequence current component is limited to a fixed, but settable, value, referred to herein as the second amplitude limit value. The regulated third amplitude of the positive phase sequence current component is limited to a dynamically calculated value, referred to herein as the regulated third amplitude, which is a function of: a fixed, but settable, total AC current amplitude limit (herein referred to as the first amplitude limit value); and the regulated second amplitude of the negative phase sequence (which may be the second amplitude limit value or a measured second amplitude of the negative phase sequence component). The function itself determines a regulated third amplitude that when combined with the regulated second amplitude, tends to give the first AC current a first amplitude that is substantially equal to the first amplitude limit value. Put differently, the function finds a positive phase sequence current that together with the negative phase sequence current (having the measured amplitude or the limited amplitude, whichever is smaller), would result in the maximum allowed total AC peak current in at least one electrical phase of an AC system.

Regulating the negative phase sequence in this manner, tends to allow for the negative phase sequence response from the power converter to be independent from the positive phase sequence response. Hence for as long as the measured second amplitude of the negative phase sequence component is below the second amplitude limit value, the power converter will tend to behave as a purely positive phase sequence AC voltage source, allowing the negative phase sequence current to flow naturally and in proportion to the degree of voltage unbalance caused by an AC system disturbance/fault. The second amplitude limit value should be set such that it is less than or equal to the first amplitude limit value. Put differently, the value of the negative phase sequence current limit should be set such that the maximum negative phase sequence output current amplitude does not exceed the maximum total AC peak current limit value.

Regulating the positive phase sequence in this manner, tends to ensure the positive phase sequence response from the power converter is dependent upon the negative phase sequence response from the power converter. Hence, the positive phase sequence current amplitude when combined with the negative phase sequence current amplitude, tends not to yield a total AC current amplitude that exceeds the total current limit for the power converter. Instead positive phase sequence amplitudes are allowed up to an amplitude limit that is defined by the regulated third amplitude.

In a first example useful for understanding the invention, a scenario typical for normal AC grid operation is where no AC voltage unbalance exists at the electrical point of connection of the power converter to the AC network (for instance an AC power grid). In such a scenario, the converter tends to behave as a purely positive phase sequence AC voltage source, and hence would not output any negative phase sequence current to the AC grid. In this case, the regulated third amplitude of the positive phase sequence component will be calculated to allow positive phase sequence current to flow with an amplitude up to the first amplitude limit value. Put differently, the whole AC ampacity of the power electronic interfaced system can be utilized for the positive phase sequence current response, should it be required.

In a further example, useful for understanding the invention, in a scenario where some AC network voltage unbalance is present at the point of connection with the power converter, but the resultant measured second amplitude of the negative phase sequence component is not greater than the second amplitude limit value, the negative phase sequence current will still be permitted to flow naturally. However, the regulated third amplitude of the positive phase sequence component will be calculated such that the positive phase sequence component can utilize only the remaining portion of the first amplitude limit value (the remaining portion of the AC ampacity of the power converter) having taken into account the negative phase sequence current flow.

In a further example, useful for understanding the invention, there is a scenario wherein a negative phase sequence component of the first AC current has a measured second amplitude that is greater than the second amplitude limit value. In this scenario, the regulated second amplitude of the negative phase sequence component will be limited to the second amplitude limit value. The regulated third amplitude hence amounts to the remaining portion of the first amplitude limit value (the AC ampacity of the power converter) after taking into account the second amplitude limit value. Again, the total AC current limit of the power converter is respected.

It may be, for instance, that the second amplitude limit value has been set to correspond to the maximum proportion of the total output current any SGFM source could contribute in any situation, such that the proposed limit coordination method would inherently scale both the positive and negative phase sequence components when operating at the limiting condition. Equal priority tends to thus be given to AC grid voltage balancing and amplitude management. Moreover, for any type of grid disturbance, the regulated/limited converter current would have a similar composition in terms of the positive and negative phase sequence components as from an unrestricted SGFM source, limited in amplitude. Hence, for the example of an AC grid insulation fault, a power electronic interfaced system when controlled in accordance with the invention, would provide the first AC current having a profile more recognizable by conventional AC system protection systems.

It may be, for instance, that the second amplitude limit value has been set (for instance by a user) to correspond to a value less than the maximum proportion of the total output current any SGFM source could contribute in any situation. This would give higher priority to the AC grid voltage amplitude enhancing function of the power converter, vice voltage symmetry restoration. The invention disclosed herein allows greater user configurability in restricting the maximum current contribution of the native phase sequence current so that it is acceptable for stable and safe operation of the power electronic conversion technology.

Some embodiments comprise measuring the negative phase sequence component to provide a measured second phase angle; measuring the positive phase sequence component to provide a measured third amplitude value and measured third phase angle; and wherein the function is further a function of an angular difference between the measured second phase angle and the measured third phase angle.

The phase angle of the respective positive and negative phase sequence components at an instant in time will tend to affect the resultant total amplitude when the components are combined. It may not necessarily be a simple algebraic sum of the regulated second and third regulated amplitudes that is desired to achieve a combination of limit values that provide the first amplitude value equal to the first amplitude limit value (as would be the case if the angular difference was zero). By further considering the angular difference in the function itself, the regulated third amplitude tends to be determined taking account of the trigonometric relationship between the negative phase sequence and positive phase sequence components. This tends to result in a greater usage of the total AC ampacity of the power converter.

The steps relating to measurement or measuring may utilize suitable measurement means. For instance, a voltmeter or ammeter may be utilized to measure voltage and current directly. The measuring steps may therefore comprises receiving the measured values and/or controlling a measurement means to obtain the measured values.

In some embodiments, the regulating the positive phase sequence component to flow with the regulated third amplitude further comprises: projecting the measured negative phase sequence component to at least one second phase vector in a reference frame of a fundamental frequency of the first AC current; and projecting the measured positive phase sequence component to at least one third phase vector in the reference frame.

When considering the electrical current capability (ampacity) of a power converter, it tends to be the case that the instantaneous sum of all current components is of importance. Moreover, for the AC contribution, the highest instantaneous current value experienced by an AC circuit element on the power converter side, tends to be, predominantly, the peak of the fundamental frequency current waveform that results from the superposition of the positive and negative phase sequence components. By projecting these components as phase vectors in a reference frame at the fundamental frequency, the regulated second amplitude and regulated third amplitude can be resolved for the fundamental frequency waveform, and hence, in a manner that considers the dominant contribution to the instantaneous current value experienced by the power converter. Phase vectors, also known as Phasors, are a convenient representation of AC power components having amplitude and phase.

In some embodiments, the first AC current is a multi-phase current; the at least one second phase vector comprises a second phase vector for each electrical phase of the multi-phase current; and the at least one third phase vector comprises a third phase vector for each electrical phase of the multi-phase current.

In some embodiments, the regulating the positive phase sequence component to flow with the regulated third amplitude further comprises: calculating, for each electrical phase of the multi-phase current, a nominal angular difference between the measured second phase angle and measured third phase angle of the corresponding second and third phase vectors, thereby generating a plurality of nominal angular differences; and selecting, as the angular difference, the minimum nominal angular difference from the plurality of nominal angular differences.

The invention as disclosed herein is of particular relevance to multi-phase, for instance three-phase, power converters and power systems. By projecting the sequence components of the plurality of electrical phases of a multi-phase system, into the reference frame, it can be determined which pair of second and third phase vectors have the smallest phase angle difference.

In some embodiments, the function is provided by Equation 1 as follows:

$$I_{lim}^{+} = \sqrt{(I_{ph,lim})^2 - (I_{ltd}^{-})^2 \cdot (\sin^2(\varphi_{min}))} - I_{ltd}^{-}\cos(\varphi_{min}) \qquad \text{Equation 1}$$

wherein $$I_{lim}^{+}$$

is the regulated third amplitude, $I_{ph,lim}$ is the first amplitude limit value, $$I_{ltd}^{-}$$

is the regulated second amplitude, $\varphi_{min}$ is the angular difference.

The function provided by Equation 1 can be compared to finding a magnitude of a vector in the direction of the third phase vector (corresponding to the measured positive phase sequence component) that when added to the second phase vector (corresponding to the measured negative phase sequence component), will make the tip of a phase vector corresponding to a total AC current fall exactly on a circular boundary, centered at the origin of the reference frame, and having radius equal to the first amplitude limit value (the total AC current amplitude limit, for the given electrical phase).

In some embodiments, the first amplitude limit value is a predetermined first amplitude limit value, preferably a maximum instantaneous total current limit for the power converter; and/or the second amplitude limit value is a predetermined second amplitude limit value, preferably a maximum negative phase sequence current limit for the power converter.

The first amplitude limit value and the second amplitude limit value being predetermined, but settable, allows the control method disclosed herein to be configured according to a given power transmission scheme. For instance, the values can be set based on knowledge of the limitations/protection/overload thresholds for power electronics in the power transmission network (particularly, the power converter). The values can also be set based on the desire to achieve voltage balance.

In some embodiments, the power converter comprises a voltage sourced converter (VSC), preferably a modular multi-level converter (MMC).

The invention disclosed herein allows greater user configurability in restricting the maximum current contributions of phase sequence currents so that the current contributions are acceptable for stable and safe operation of the power electronic conversion technology. For instance, for MMC VSC HVDC converter stations, a too high level of negative phase sequence current may disrupt valve energy management processes, or could require overdesign of circuits (e.g. by inclusion of additional valve sub-modules).

In some embodiments, the power transmission network is a high voltage direct current (HVDC) power transmission network.

HVDC power transmission networks utilize power electronic converters and control methods such as SGFM for which the problems hereinbefore mentioned occur. The invention described herein provides a solution to these problems.

In some embodiments, the AC network is an AC power grid.

As discussed herein, faults such as insulation faults to earth in an AC power grid can cause voltage unbalance at the point of connection of an AC power grid to a power converter. This can result in large negative and positive sequence current exchange, risking damage to power electronics. The invention discussed herein provides a solution that protects power electronics from protection operation, whilst still allowing negative and positive sequence current to flow in a coordinated manner.

In some embodiments, the method is for use in SGFM.

In SGFM, power electronic converters are configured to behave as voltage sources. However, said converters have intrinsic limitations with respect to current flow that other synchronous devices may not be so susceptible to. The invention described herein considers such limitations and controls the converter in a manner that regulates negative and positive phase sequence current flow to safe levels for converter hardware, when required.

According to a second aspect of the invention, there is provided a controller for controlling a power converter in a power transmission network, the controller comprising: a memory; and at least one processor; wherein the memory comprises computer-readable instructions which when executed by the at least one processor cause the controller to perform the method of the first aspect of the invention.

According to a third aspect of the invention, there is provided a power converter for a power transmission network, comprising: an AC side for electrically connecting to an AC network at a point of connection; and a DC side for electrically connecting to a DC network; and the controller of the second aspect of the invention.

According to a fourth aspect of the invention, there is provided a power transmission network comprising: an AC network; a DC network; and the power converter according to the third aspect of the invention, wherein the AC network is connected to the AC side of the power converter and the DC network is connected to the DC side of the power converter.

According to a fifth aspect of the invention, there is provided a computer program comprising instructions which when executed by a processor of a controller for a power converter, cause the controller to perform the method of the first aspect of the invention.

According to a sixth aspect of the invention, there is provided a non-transitory computer-readable storage medium comprising the computer program of the fifth aspect of the invention.

It will be appreciated that particular features of different aspects of the invention share the technical effects and benefits of corresponding features of other aspects of the invention. More specifically, the controller, power converter, power transmission network, computer program, non-transitory computer-readable medium, share the technical effects and benefits of the computer-implemented method of the invention.

It will also be appreciated that the use of the terms "first" and "second", and the like, are merely intended to help distinguish between similar features and are not intended to indicate a relative importance of one feature over another, unless otherwise specified.

Within the scope of this application it is expressly intended that the various aspects, embodiments, examples and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible.

BRIEF DESCRIPTION OF THE DRAWINGS

Embodiments of the invention will now be described by way of example only and with reference to the accompanying drawings, in which.

DETAILED DESCRIPTION

Figure 1:
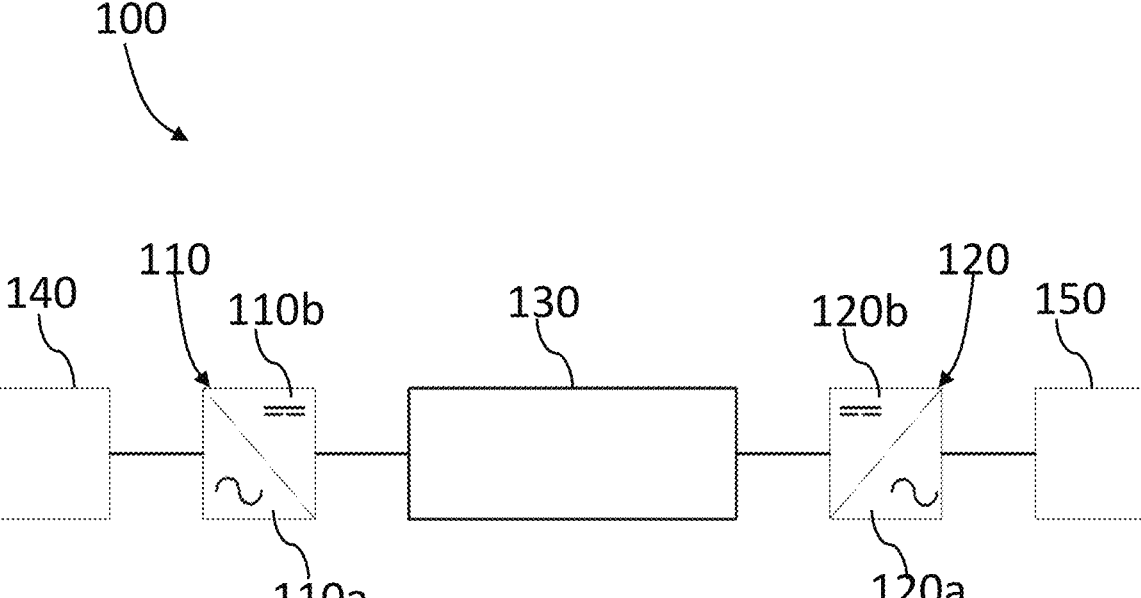
FIG. 1 shows generically, an example of a power transmission network.

FIG. 1 provides generically, an example of a power transmission network 100. The illustration is not intended to be limited to representing a particular power transmission scheme, such as a monopole or bipole HVDC transmission network, but is moreover provided as a generic example illustrating principles of operation of a power transmission network that are useful for understanding the invention. In this manner, the power transmission network 100 may represent, generically, a monopole or bipole scheme, or may represent a multiterminal power transmission scheme, for instance. Hence whilst specific features in the illustration are shown connected to each other with a specific number of connections, it will be understood that this is not intended to be limiting either, but moreover to illustrate a generic connection between features/components. Related, is that relative dimensions or distances between components perceived in the illustration are also not intended to be limiting. It will therefore be understood that principles and features in the network 100 and herein discussed can be applied to networks comprising the controller 200 of FIG. 2, for instance. Furthermore, the method 400 of FIG. 4 may be exercised in a network 100.

The power transmission network 100 has a first power conversion means 110 (also known as a converter station) and a second power conversion means 120. The power conversion means 110, 120, convert AC power to DC power (and vice versa), acting essentially as a rectifier (when converting AC power to DC power for transmission) and an inverter (when receiving DC power and converting to AC power). The power conversion means 110, 120, may each comprise a single converter in the case of a monopole system, or two converters in the case of a bipole system. The power conversion means 110, 120, may represent a plurality of converter stations arranged as a multi-terminal power transmission system. Generically, the first power conversion means 110 comprises a first AC side 110a and a first DC side 110b. Generically, the second power conversion means 120 comprises a second AC side 120a and a second DC side 120b.

The first power conversion means 110 is connected to a first AC network 140. The first AC network 140 is connected to the first AC side 110a of the first power conversion means 110.

The second power conversion means 120 is connected to a second AC network 150. The second AC network 150 is connected to the second AC side 120a of the second power conversion means 120. The first AC network 140 and/or second AC network 150 may be electrical power transmission systems comprising power generation apparatus, transmission apparatus, distribution apparatus, and electrical loads. The first AC network 140 and/or second AC network 150 may comprise a renewable power generation network such as a wind-power generation network, solar-power generation network, bio-power generation network. The first AC network 140 or second AC network 150 may be a consumer network. By way of non-limiting example, the first AC network 140 may be a power generation network with the second AC network 150 being a consumer network, for instance.

Also shown is a power transmission medium 130 interconnecting the first power conversion means 110 and the second power conversion means 120. The power transmission medium 130 is connected between the first DC side 110b of first power conversion means 110 and the second DC side 120b of the second power conversion means 120. The power transmission medium 130 may comprise electrical cables and other electrical components interconnecting the first and second power conversion means 110, 120. For instance, the power transmission medium 130 may comprise a conductor providing a first electrical pole; and/or a conductor providing a second electrical pole. A neutral arrangement may also be provided interconnecting the first and second power conversion means 110, 120. The power transmission medium 130 provides the medium through which DC power is transmitted between the power conversion means 120, 130.

The operation of the power transmission system 100 can be generically described as follows. The first AC power generation network 140 generates AC power that is provided to first power conversion means 110 at the first AC side 110a. The first power conversion means 110 converts the received AC power to a DC power for transmission to second power conversion means 120. The DC power is transmitted from first DC side 110b over power transmission medium 130 to the second DC side 120b of second power conversion means 120. The second power conversion means 120 converts the received DC power back to an AC power. The AC power to then provided from second AC side 120a to second AC network 150 for consumption. In particular examples, the power conversion means 110 and 120 may be geographically remote. For instance, the first power conversion means 110 may reside with an off-shore wind farm and the second power conversion means 120 may reside on-shore.

It will be appreciated that various other electrical components may be located at any particular location or with any particular feature/component in the example 100. These may include switches, transformers, resistors, reactors, surge arrestors, harmonic filters and other components well known in the art.

It will be appreciated that converters or power conversion means may comprise a number of different technologies such as voltage sourced converters (for instance using insulated gate bipolar transistor (IGBT) valves). Such converters may generally be considered to use 'power electronics'. Power electronic converters may comprise multi-level voltage sourced converters, for instance.

It will be appreciated that cables used as power transmission mediums may comprise the following non-limiting examples of crosslinked polyethylene (XLPE) and/or mass impregnated (MI) insulation cables. Such cables may comprise a conductor (such as copper or Aluminium) surrounding by a layer of insulation. Dimensions of cables and their associated layers may be varied according to the specific application (and in particular, operational voltage requirements). Cables may further comprise strengthening or 'armouring' in applications such as subsea installation.

Moreover, it will be understood that the power transmission network 100 may be used with three-phase power systems. In a three-phase power system, three conductors supply respective first, second and third phases of AC power to a consumer. Each of the first, second and third phases will typically have equal magnitude voltages or currents, which are displaced in phase from each other by 1200.

In a three-phase power system, phase currents and voltages can be represented by three single phase components: a positive sequence component; a negative sequence component; and a zero-sequence component. It is the positive sequence component that rotates in phase in accordance with the power system. Hence, in the idealistic scenario, only positive sequence voltage/current will exist. It will be understood that an unbalance in voltage or current between the first, second and third-phases, of a three-phase system, in magnitude or phase angle, can give rise to undesirable negative or zero-sequence components. It will also be understood that, for a typical power converter connected to an AC grid, via an AC transformer, the winding configuration of the transformer may not allow flow of zero sequence components in the AC circuit on the converter-side of the AC transformer.

The power transmission network 100 may be operated using methods such as synchronous grid forming (SGFM) wherein either or both of the power converters 110, 120 behave as three-phase, positive-phase sequence AC voltage sources behind an impedance, that operate at a frequency synchronous with over SGFM sources connected to the power transmission network 100.

The power transmission network 100 may further comprise a controller for controlling the operation of components of the power transmission network 100. For instance, a controller may be provided for executing the methods described herein. Such a controller may control the power conversion means 110, 120, for instance. The controller may be the controller 200 of FIG. 2.

Figure 2:
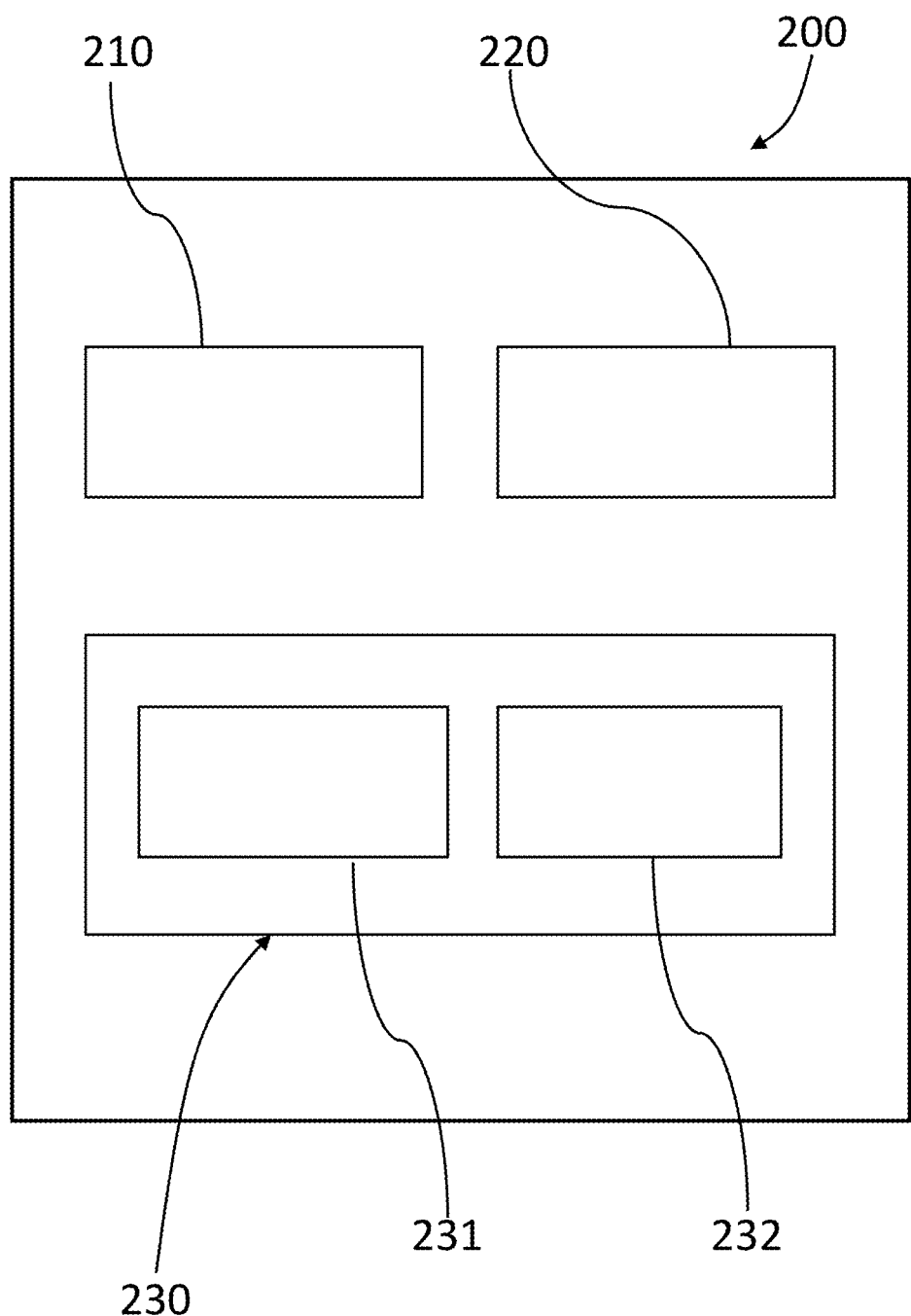
FIG. 2 shows an embodiment of a controller for a power converter.

FIG. 2 illustrates an embodiment of a controller 200 as may be used in implementing the invention described herein.

The controller 200 comprises a memory 210 and at least one processor 220. The memory 210 comprises computer-readable instructions, which when executed by the at least one processor 220, cause the controller 200 to perform the method/s described herein.

The controller 200 is illustrated as comprising a transceiver arrangement 230 which may comprise a separate transmitter 231 and receiver 232. The transceiver arrangement 230 may be used to operatively communicate with other components or features of embodiments described herein either directly or via a further interface such as a network interface. The transceiver arrangement 230 may for instance send and receive control signals using transmitter 231 and receiver 232. The control signals may contain or define electrical control parameters such as reference currents or reference voltages.

The at least one processor 220 is capable of executing computer-readable instructions and/or performing logical operations. The at least one processor 220 may be a microcontroller, microprocessor, central processing unit (CPU), field programmable gate array (FPGA) or similar programmable controller. The controller may further comprise a user input device and/or output device. The processor 220 is communicatively coupled to the memory 210 and may in certain embodiments further comprise and be coupled to the transceiver 230.

The memory 210 may be a computer readable storage medium. For instance, the memory 210 may include a non-volatile computer storage medium. For example, the memory 210 may include a hard disk drive, flash memory etc.

Whilst not illustrated, the controller 200 may additionally include a user input device interface and/or a user output device interface, which may allow for visual, audible or haptic inputs/outputs. Examples include interfaces to electronic displays, touchscreens, keyboards, mice, speakers and microphones.

The controller 200 may represent a controller for SGFM control of, for instance, a power converter, such as the power conversion means 110, 120, of FIG. 1.

Figure 3:
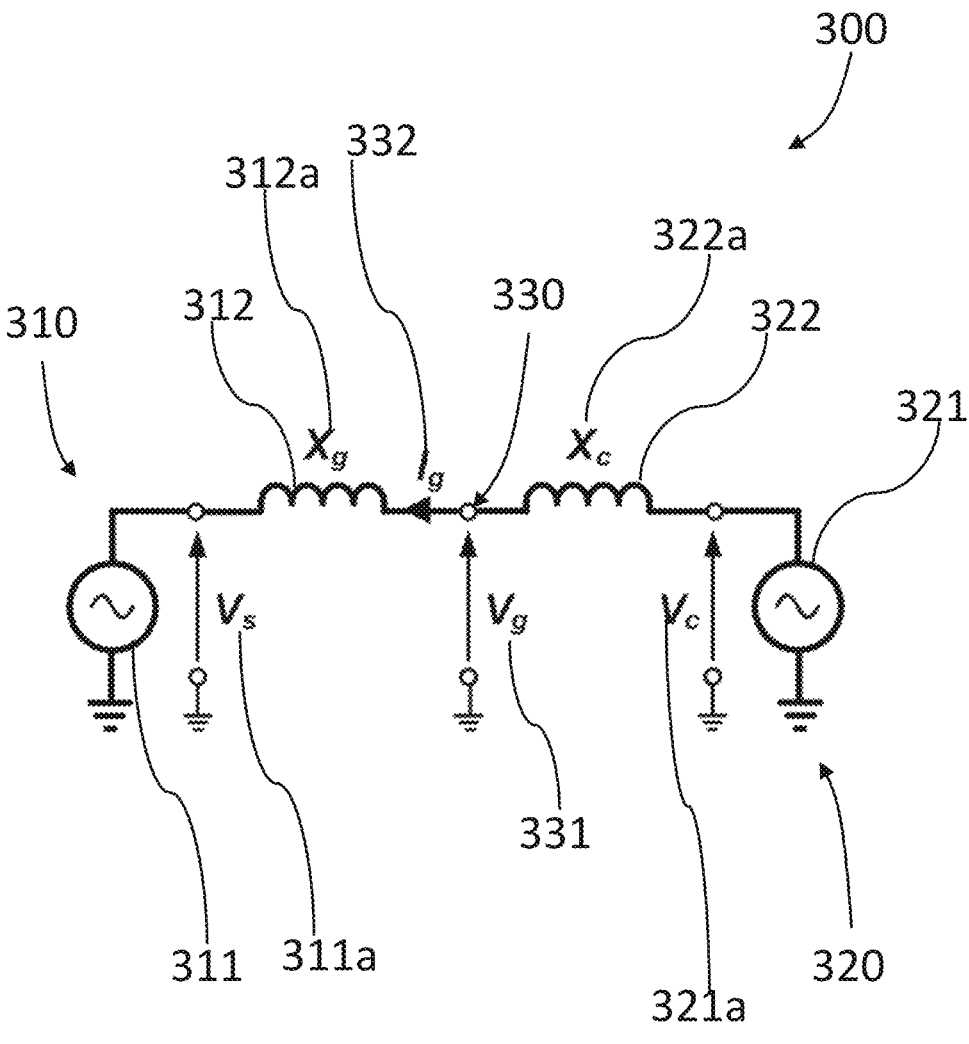
FIG. 3 shows an example schematic of a power converter arranged as a voltage sourced converter.

FIG. 3 illustrates an electrical schematic 300, useful for understanding the invention, showing a power converter arranged as a voltage sourced converter.

The schematic 300 shows power grid 310 represented by a first voltage source 311 electrically connected in series with a first electrical component 312. The first voltage source 311 has an associated measured source voltage 311*a* referred to as 'V$_s$'. The first electrical component 312 provides an impedance 312*a* referred to as 'X$_g$'.

The schematic 300 also shows a power converter 320 represented by a second voltage source 321 electrically connected in series with a second electrical component 322. The second voltage source 321 has an associated measured converter voltage 321*a* referred to as 'V$_c$'. The second electrical component 322 provides an impedance 322*a* referred to as 'X$_c$'.

The schematic 300 further illustrates that the first electrical component 312 is electrically connected to the second electrical component 322 at an electrical point of connection 330. A grid voltage 331, referred to as 'V$_c$' is illustrated as being present at the electrical point of connection 330. A grid current 332, referred to as 'I$_g$' is illustrated as flowing through the electrical point of connection 330.

The schematic 300 illustrates how, at the point of connection 330, the power converter 320 appears as a voltage source connected in series with an impedance. Hence the power converter 320 can be operated as a controllable AC voltage source. Similarly, the schematic 300 illustrates how, at the point of connection 330, the power grid 310 appears as a voltage source connected in series with an impedance.

For a three-phase system, the AC voltages can be decomposed into respective symmetrical components for positive phase sequence, negative phase sequence and zero phase sequence. An analogous decomposition of the grid AC current 332 can be performed. Methods for resolving measured AC voltages and currents to symmetrical components are known in the art and will not be further described herein.

Converter control according to the invention disclosed herein, may advantageously define positive and negative phase sequence AC voltage outputs from a converter in terms of amplitude and angle. When current limiting is not active, the positive phase sequence voltage output from the converter tends to be determined by normal application control level functions such as active and reactive power control, whilst the converter negative phase sequence voltage would be kept at zero. For a typical high voltage AC network/AC transmission grid, whose impedance is predominantly reactive, the positive phase sequence voltage phase angle will be determined mainly by the algorithm/control method regulating the active power output of the power electronic converter. Analogously, the amplitude of the positive phase sequence voltage will be determined mainly by the algorithm/control method regulating the reactive power output of the power electronic converter to the AC network/grid. Methods for the direct control of active and reactive power outputs via the positive phase sequence voltage amplitude and angle control are provided in U.S. Pat. No. 5,798,633.

To ensure that the converter output AC current (the first AC current), and specifically the fundamental frequency current thereof, is within an acceptable range, the positive and negative phase sequence voltages produced by the converter will be individually subjected to limits that are respectively a function of the positive and negative phase sequence current limits (regulated second amplitude, regulated third amplitude) determined as described herein.

Figure 4:
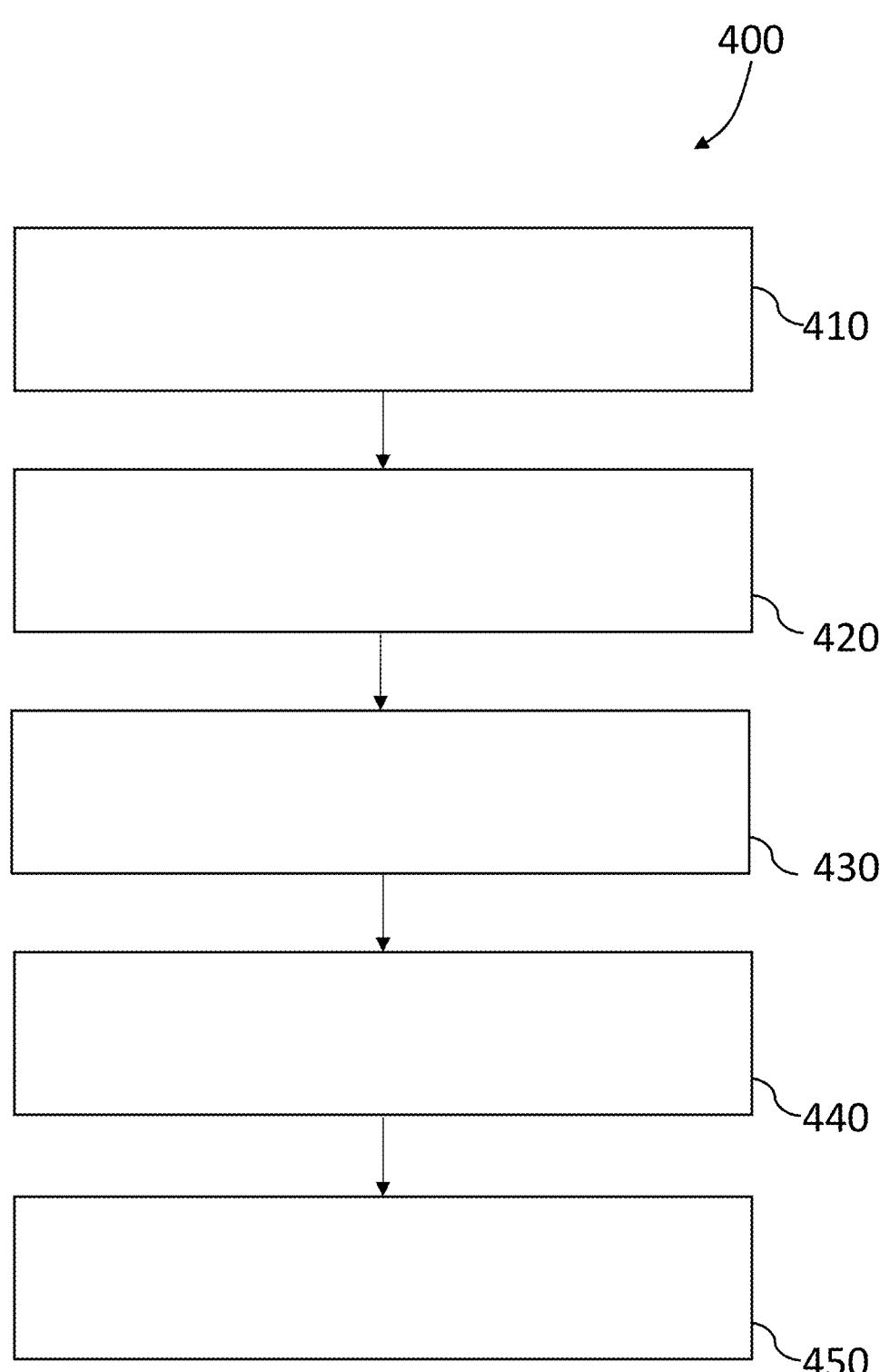
FIG. 4 shows an embodiment of a method of controlling a power converter in a power transmission network.

FIG. 4 provides an illustration of an embodiment of a computer-implemented method 400 of controlling a power converter in a power transmission network, the power converter having an AC side electrically connected to an AC network at a point of connection.

A first step 410 comprises receiving a first amplitude limit value for a first AC current, the first AC current being output from the AC side of the power converter.

A further step 420 comprises receiving a second amplitude limit value for a negative phase sequence component of the first AC current, wherein the second amplitude limit value is less than or equal to the first amplitude limit value.

A further step 430 comprises, measuring the negative phase sequence component of the first AC current to provide a measured second amplitude.

A further step 440 comprises regulating the negative phase sequence component to flow with a regulated second amplitude, by: if the measured second amplitude is less than the second amplitude limit value, setting the regulated second amplitude to be the measured second amplitude; and if the measured second amplitude is equal to or greater than the second amplitude limit value, setting the regulated second amplitude to be the second amplitude limit value.

A further step 450 comprises regulating a positive phase sequence component of the first AC current to flow with an amplitude not exceeding a regulated third amplitude by: setting the regulated third amplitude as a function of the first amplitude limit value and the regulated second amplitude, such that the regulated second amplitude and the regulated third amplitude, when combined, provide a first amplitude for the first AC current that is substantially equal to the first amplitude limit value.

A preferred embodiment of the invention will now be described by way of example only. The goal of the preferred embodiment, and the invention more generally, tends to be to provide positive and negative phase sequence current limit coordination that ensures, at the limit condition, where both positive and negative phase sequence current components are at their respective assigned amplitude limit values (regulated second amplitude and regulated third amplitude), the amplitude of the resulting fundamental frequency AC current of the first AC current output by the power converter, is at the designated total AC current limit (first amplitude limit value) in one or more electrical phases of an AC system. The regulated second amplitude will be referred to as $$I_{ltd}^-,$$

and the regulated third amplitude will be referred to as $$I_{lim}^+.$$

The first amplitude limit value (that is, the designated total AC current limit) will be referred to as $l_{ph,lim}$.

In the preferred embodiment, a first AC current output from a power converter is considered as comprising a negative phase sequence component and a positive phase sequence current component.

A measured second amplitude of the negative phase sequence component, denoted I" is compared with a fixed, but settable, second amplitude limit value, denoted $$I_{lim}^-.$$

The smaller value is taken forward as the regulated second amplitude $$I_{ltd}^-.$$

The measured negative phase sequence component and a measured positive phase sequence component are then projected to corresponding second and third phase vectors in a fundamental frequency reference frame. In the example, representing a three-phase electrical system, the second and third phase vectors can be represented by Equations 2 and 3 respectively, $$\vec{I}^- = |I^-| \cdot e^{jLI^-} \qquad \text{Equation 2}$$

$$\vec{I}^+ = |I^+| \cdot e^{jLI^+} \qquad \text{Equation 3}$$

wherein the components of Equation 2 can be represented as three phase vectors $$\vec{I}_a^-, \vec{I}_b^-, \vec{I}_c^-,$$

one for each electrical phase (a, b, c) of the three-phase system, and Equation 3 can be represented as three phase vectors $$\vec{I}_a^+, \vec{I}_b^+, \vec{I}_c^+,$$

one for each electrical phase (a, b, c) of the three-phase system.

Figure 5:
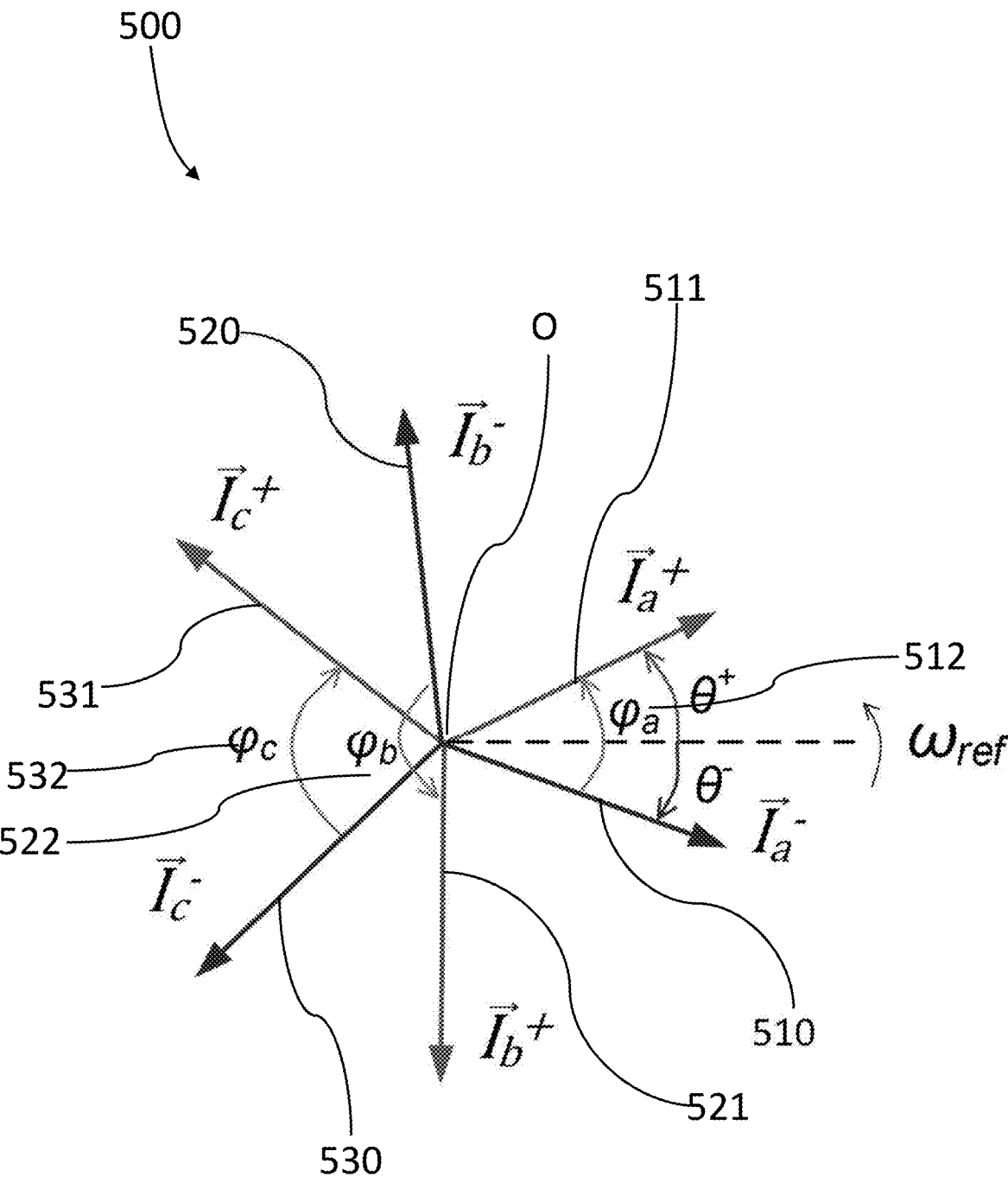
FIG. 5 shows an example phase-vector diagram representation of the projection of the negative phase sequence and positive phase sequence components into a fundamental frequency reference frame.

FIG. 5 shows a graphical representation 500 of the projection of the negative phase sequence and positive phase sequence components into a fundamental frequency reference frame. The graphical representation 500 may also be referred to as a phasor diagram.

The graphical representation 500 has an origin 'O'. Extending from the origin O are second phase vectors 510, 520, 530, representing the negative phase sequence components $$\vec{I}_a^-, \vec{I}_b^-, \vec{I}_c^-$$

of the three electrical phases. Also extending from the origin O are the third phase vectors 511, 521, 531, representing the positive phase sequence components $$\vec{I}_a^+, \vec{I}_b^+, \vec{I}_c^+$$

of the three electrical phases.

The second phase vectors 510, 520, 530, and their corresponding third phase vectors 511, 521, 531, have different phase angles. The nominal angular difference 512 between phase vectors 510 and 511 is denoted $\varphi_a$. The nominal angular difference 522 between phase vectors 520 and 521 is denoted $\varphi_b$. The nominal angular difference 532 between phase vectors 530 and 531 is denoted $\varphi_c$.

The angular rotation of the positive phase vectors is illustrated as $\omega_{ref}$.

The smallest/minimum angular difference of the nominal angular differences 512, 522, 532, is chosen as a minimum angular difference $\varphi_{min}$ for the purposes of further calculations. More specifically, Equation 1 is solved to determine the regulated third amplitude $$I_{lim}^+$$

for the positive phase sequence component of an electrical phase, using the determined $\varphi_{min}$, the first amplitude limit value $1_{ph,lim}$, and the regulated second amplitude $$I_{ltd}^-.$$

Hence, the regulated third amplitude is calculated in such a way that tends to ensure the positive phase sequence component of current can utilize the whole available AC ampacity of the power electronic converter which is not already being utilized by the negative phase sequence component of current.

Expressed differently, the calculation can be compared to finding the magnitude of a vector in the direction of the measured positive phase sequence current vector (third phase vector) that when added to the measured negative phase sequence current vector (second phase vector), will make the tip of the longest phase current vector, fall exactly on a circular boundary that is centered at the origin and has a radius equal to the AC phase current amplitude limit (first amplitude limit value).

To further understand the invention, a number of example scenarios experienced during operation of a power converter will now be described, with reference to graphical representations of the resultant positive and negative phase components of current output from the power converter.

Figure 6:
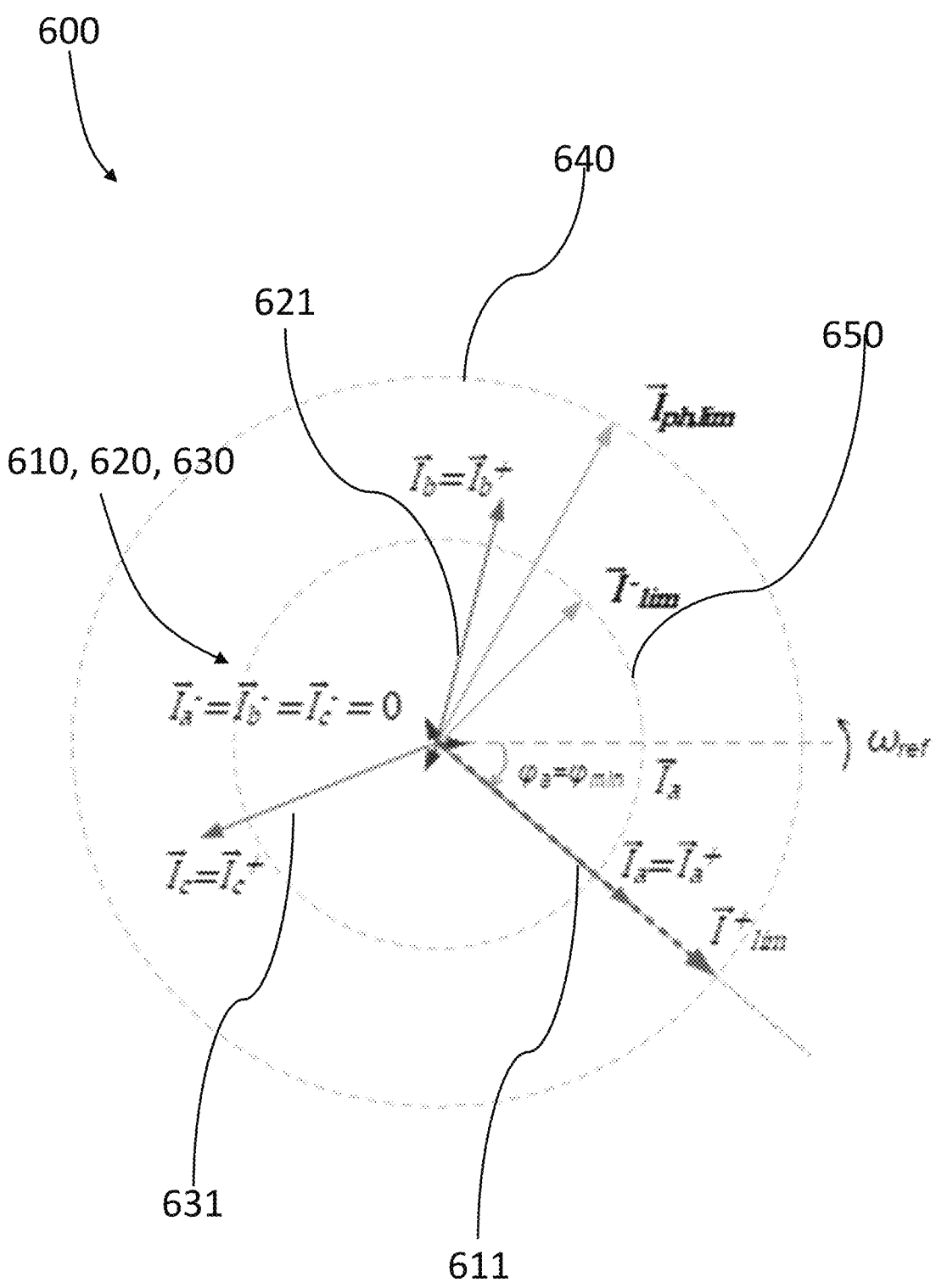
FIG. 6 shows a further example of a phase-vector diagram.

In a first example, useful for understanding the invention, a grid voltage is balanced and a power converter is controlled, in a SGFM mode, to not output any negative phase sequence current to the grid. The relevant phase vector diagram is shown in FIG. 6.

The phase vector diagram 600 shows second phase vectors 610, 620, 630, representing the negative phase sequence components of current $$\vec{I}_a^-, \vec{I}_b^-, \vec{I}_c^-$$

all having zero amplitude. In this scenario, the third phase vectors 611, 621, 631, representing the positive phase sequence components of current $$\vec{I}_a^+, \vec{I}_b^+, \vec{I}_c^+,$$

are simply equal to the positive phase sequence current vectors resulting from the normal active and reactive power load of the power converter. Because there is no negative sequence current, the regulated third amplitude $$I_{lim}^+$$

for the positive phase sequence, is equal to the first amplitude limit value $l_{ph,lim}$, i.e. the total current amplitude limit for the converter, as illustrated by circular boundary 640. Whilst the second amplitude limit value, $$I_{lim}^-,$$

is also illustrated as a circular boundary region 650, it is not utilized in this scenario. A similar situation tends to occur during a symmetrical disturbance, such as a three-phase to earth fault, where there may be no negative phase sequence current flow, and hence the power electronic interfaced system fault current contribution may be a purely positive phase sequence current with amplitude up to $l_{ph,lim}$.

In a further example, useful for understanding the invention, there may be some negative phase sequence current present in the converter output AC current (the first AC current). This may result from a distant asymmetrical AC insulation fault. However, the measured second amplitude of the negative phase sequence component $$\vec{I}_a^-, \vec{I}_b^-, \vec{I}_c^-$$

may still be lower than the second amplitude limit value $$I_{lim}^-.$$

Figure 7:
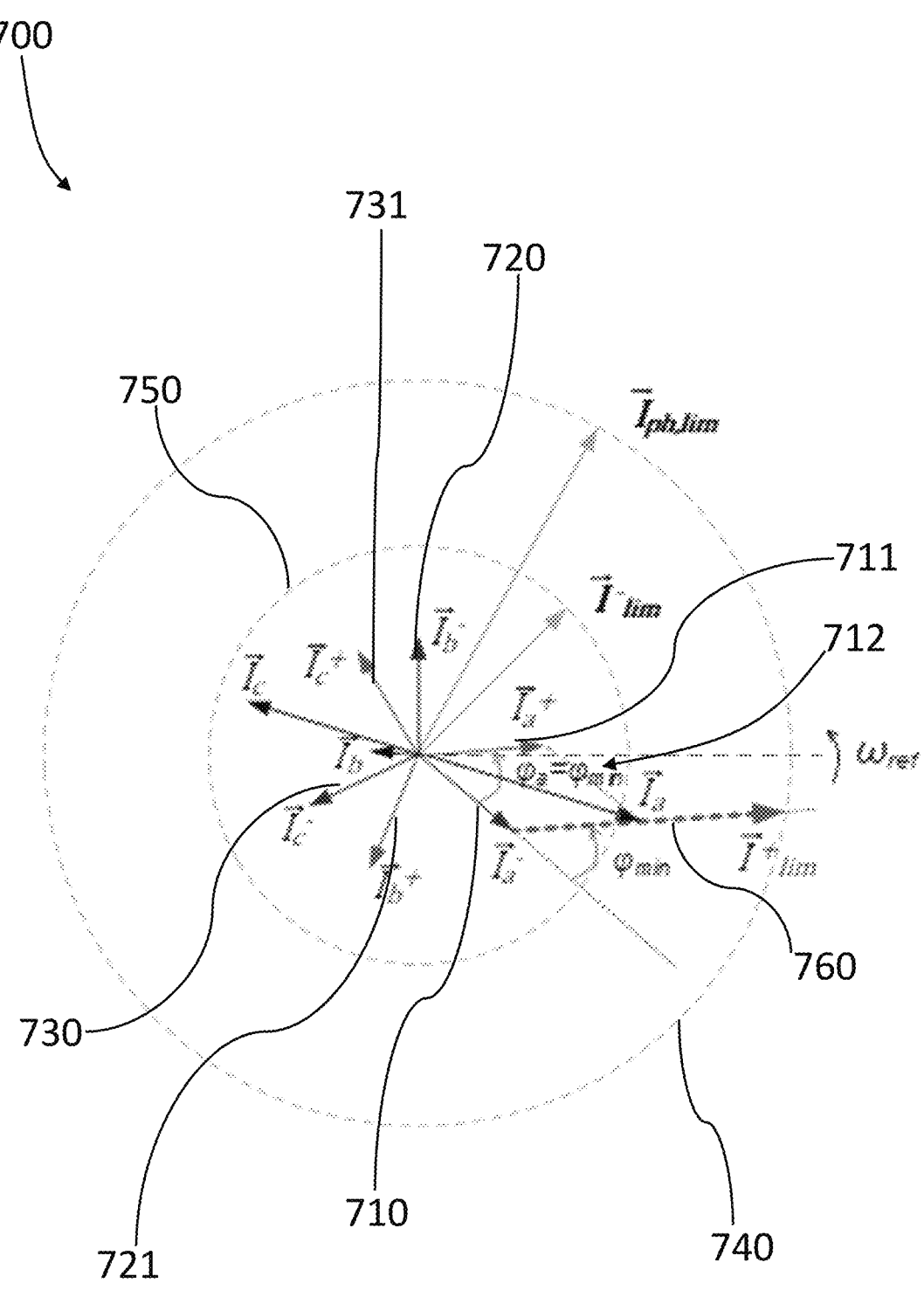
FIG. 7 shows a further example of a phase-vector diagram.

Such a scenario is shown in the phase vector diagram of FIG. 7.

The phase vector diagram 700 shows second phase vectors 710, 720, 730, representing the negative phase sequence components of current $$\vec{I}_a^-, \vec{I}_b^-, \vec{I}_c^-$$

all having non-zero amplitude. The second phase vectors 710, 720, 730, have measured second amplitudes that are less than the second amplitude limit value $$I_{lim}^-$$

illustrated as circular boundary 750. Hence, the negative phase sequence components are permitted to flow naturally. The measured second amplitude becomes the regulated second amplitude.

In this scenario, the third phase vectors 711, 721, 731, representing the positive phase sequence components of current $$\vec{I}_a^+, \vec{I}_b^+, \vec{I}_c^+,$$

do not have a regulated third amplitude that is equal to the first amplitude limit value $l_{ph,lim}$ 740. Instead, the already allocated portion of the first amplitude limit value 740 given to the negative phase sequence component 710, 720, 730, must be factored into the calculation.

In the diagram 700, the minimum angular difference $\varphi_{min}$ is the angle 712 between the phase vectors 710 and 711, denoted $\varphi_a$. Hence, the regulated third amplitude $$I_{lim}^+$$

for the positive sequence component is defined by the projection 760 from the tip of the second phase vector 710, extending parallel to third phase vector 711, to the first amplitude limit value 740.

As a further example, the smallest regulated third amplitude value that the methods described herein may allocate to the positive phase sequence, correspond to the scenario where the measured second amplitude of the negative phase sequence current reaches the second amplitude limit value $$I_{lim}^-.$$

Figure 8:
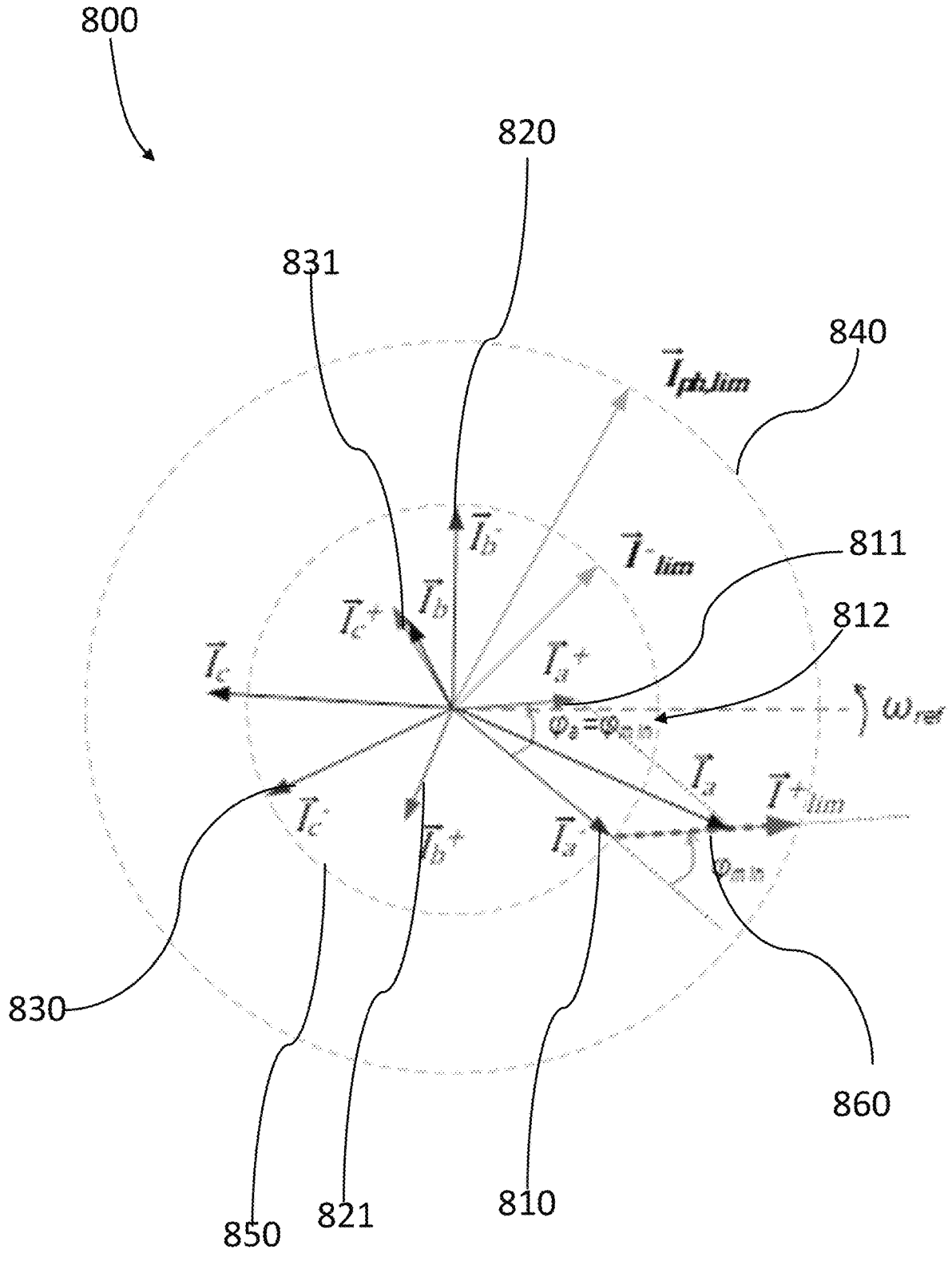
FIG. 8 shows a further example of a phase-vector diagram.

Such a scenario is illustrated in FIG. 8.

The phase vector diagram 800 shows second phase vectors 810, 820, 830, representing the negative phase sequence components of current $$\vec{I}_a^-, \vec{I}_b^-, \vec{I}_c^-$$

all having non-zero amplitude. The second phase vectors 810, 820, 830, have measured second amplitudes that are equal to the second amplitude limit value $$I_{lim}^-$$

illustrated as circular boundary 850. Hence, the negative phase sequence components are regulated/limited to having a second regulated amplitude equal to the second amplitude limit value 850.

In this scenario, the third phase vectors 811, 821, 831, representing the positive phase sequence components of current $$\vec{I}_a^+, \vec{I}_b^+, \vec{I}_c^+,$$

19 do not have a regulated third amplitude that is equal to the first amplitude limit value $l_{ph,lim}$ 840. Instead, the already allocated portion of the first amplitude limit value 840 given to the negative phase sequence component 810, 820, 830, must be factored into the calculation.

In the diagram 800, the minimum angular difference $\varphi_{min}$ is the angle 812 between the phase vectors 810 and 811, denoted $\varphi_a$. Hence, the regulated third amplitude $$I_{lim}^+$$

for the positive sequence component is defined by the projection 860 from the tip of the second phase vector 810, extending parallel to third phase vector 811, to the first amplitude limit value 840. This scenario presents the limit case because the negative phase sequence limiting ensures that the negative phase sequence current amplitude does not exceed the corresponding limit value.

It should be noted that the minimum value the positive phase sequence current amplitude limit $$I_{lim}^+$$

can reach, is not just a simple algebraic difference between the fundamental frequency phase current amplitude limit $l_{ph,lim}$ and the negative phase sequence current amplitude limit $$I_{lim}^-.$$

That happens only in the case when two positive and negative sequence phase vectors align for one of the phases, giving the minimum phase vector angle/angular difference $\varphi_{min}$ equal to zero. On the other hand, the biggest value the positive phase sequence current amplitude limit $$I_{lim}^+$$

could reach when the negative phase sequence current amplitude reaches its corresponding limit $$I_{lim}^-$$

is when the minimum phase vector angle $\varphi_{min}$ is equal to 60°. Taking a numerical example where the fundamental frequency phase current amplitude limit (the first amplitude limit value) $l_{ph,lim}$ has value of 1 pu and where the negative phase sequence current amplitude is equal to its limit (the second amplitude limit value)

$$I_{lim}^-$$

20 the positive phase sequence current amplitude limit $$I_{lim}^+$$

could be in the range between 0.5 and 0.6514 pu, depending on the angle relationship between the symmetrical current components. This shows that the proposed coordination method always utilises the whole AC ampacity of the power electronic interfaced system.

The invention described herein is particularly relevant for controlling converters during asymmetrical faults and when the converter operates in SGFM control modes.

The invention described herein tends to best utilize the capability of a power converter, during an AC system fault, when some magnitude of negative phase sequence voltage exists in the system.

Further advantages of the invention tend to include: the provision of a control method that tends to allow the natural flow of negative phase sequence currents in fault events up to a negative phase sequence current limit, whilst allowing the remainder of a total current limit to be allocated to positive phase sequence currents; that the phase relationship between the negative phase sequence currents and the positive phase sequence currents, tends to be maintained; that the relative amplitude proportions of the positive phase sequence current component compared to the negative phase sequence current component tends to be maintained; allowing a power converter to inherently self-adjust to an imposed network condition; the power converter fundamental frequency AC current tends to be limited such that the positive phase sequence components and negative phase sequence components do not, when combined, exceed power converter limits; a power converter operating according to the invention tends to inherently support voltage balancing, if required; the power converter ampacity tends to be fully utilized; the current profile of the power converter during a fault event, tends to be similar to a synchronous machine (albeit with lower amplitude).

Reference throughout this specification to an example of a particular method or apparatus, or similar language, means that a particular feature, structure, or characteristic described in connection with that example is included in at least one implementation of the method and apparatus described herein. The terms "including", "comprising", "having", and variations thereof, mean "including but not limited to", unless expressly specified otherwise. An enumerated listing of items does not imply that any or all of the items are mutually exclusive, unless expressly specified otherwise. The terms "a", "an", and "the" also refer to "one or more", unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one, and only one, of any single item in the list. For example, "one of A, B and C" includes only A, only B or only C and excludes combinations of A, B and C. As used herein, "a member selected from the group consisting of A, B, and C" includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Aspects of the disclosed method and apparatus are described with reference to schematic flowchart diagrams and/or schematic block diagrams of methods, apparatuses, systems, and program products. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The schematic flowchart diagrams and/or schematic block diagrams in the Figures illustrate the architecture, functionality, and operation of possible implementations of apparatuses, systems, methods, and program products. In this regard, each block in the schematic flowchart diagrams and/or schematic block diagrams may represent a module, segment, or portion of code, which includes one or more executable instructions of the code for implementing the specified logical function(s).

It will be appreciated that numerical values recited herein are merely intended to help illustrate the working of the invention and may vary depending on the requirements of a given power transmission network, component thereof, or power transmission application.

The listing or discussion of apparently prior-published documents or apparently prior-published information in this specification should not necessarily be taken as an acknowledgement that the document or information is part of the state of the art or is common general knowledge.

Preferences and options for a given aspect, feature or parameter of the invention should, unless the context indicates otherwise, be regarded as having been disclosed in combination with any and all preferences and options for all other aspects, features and parameters of the invention.

The disclosure herein provides a synchronous grid forming control method for a power electronic interfaced system connected to an AC grid at an electrical point called a point of connection, wherein the positive and negative phase sequence components of a fundamental frequency output AC current are allocated individual amplitude limit values, wherein the negative phase sequence current is allocated a fixed, but settable, value, and the positive phase sequence current is allocated a dynamically calculated value which is a function of a fixed, but settable, AC phase current amplitude limit value and the negative phase sequence current measured and limit values, such that the amplitude of the prospective AC phase current corresponding to those sequence limit values would be equal to the AC phase current amplitude limit value in one or more phases.

In some embodiments, the power electronic interfaced system comprises an HVDC converter station.

In some embodiments, an angle between the positive and negative phase sequence current is considered in the calculation of the positive phase sequence current amplitude limit value.

We claim:

1. A computer-implemented method of controlling a power converter in a power transmission network, the power converter having an alternating current 'AC' side electrically connected to an AC network at a point of connection, the method comprising:

receiving a first amplitude limit value for a first AC current, the first AC current being output from the AC side of the power converter;

receiving a second amplitude limit value for a negative phase sequence component of the first AC current, wherein the second amplitude limit value is less than or equal to the first amplitude limit value;

measuring the negative phase sequence component of the first AC current to provide a measured second amplitude;

regulating the negative phase sequence component to flow with a regulated second amplitude by:

if the measured second amplitude is less than the second amplitude limit value, setting the regulated second amplitude to be the measured second amplitude;

if the measured second amplitude is equal to or greater than the second amplitude limit value, setting the regulated second amplitude to be the second amplitude limit value;

regulating a positive phase sequence component of the first AC current to flow with an amplitude not exceeding a regulated third amplitude by:

setting the regulated third amplitude as a function of the first amplitude limit value and the regulated second amplitude, such that the regulated second amplitude and the regulated third amplitude, when combined, provide a first amplitude for the first AC current that is substantially equal to the first amplitude limit value.

2. The computer-implemented method of claim 1, comprising:

measuring the negative phase sequence component to provide a measured second phase angle;

measuring the positive phase sequence component to provide a measured third amplitude value and measured third phase angle;

wherein the function is further a function of an angular difference between the measured second phase angle and the measured third phase angle.

3. The computer-implemented method of claim 2, wherein the regulating the positive phase sequence component to flow with the regulated third amplitude further comprises:

projecting the measured negative phase sequence component to at least one second phase vector in a reference frame of a fundamental frequency of the first AC current; and projecting the measured positive phase sequence component to at least one third phase vector in the reference frame.

4. The computer implemented method of claim 3, wherein:

the first AC current is a multi-phase current;

the at least one second phase vector comprises a second phase vector for each electrical phase of the multi-phase current; and the at least one third phase vector comprises a third phase vector for each electrical phase of the multi-phase current.

5. The computer implemented method of claim 4, wherein the regulating the positive phase sequence component to flow with the regulated third amplitude further comprises:

calculating, for each electrical phase of the multi-phase current, a nominal angular difference between the measured second phase angle and measured third phase angle of the corresponding second and third phase vectors, thereby generating a plurality of nominal angular differences; and selecting, as the angular difference, a minimum nominal angular difference from the plurality of nominal angular differences.

6. The computer implemented method of claim 5, wherein the function is:

$$I_{lim}^{+} = \sqrt{(I_{ph,lim})^2 - (I_{ltd}^{-})^2 \cdot (\sin^2(\varphi_{min}))} - I_{ltd}^{-}\cos(\varphi_{min})$$

wherein $$I_{lim}^{+}$$

is the regulated third amplitude, $1_{ph,lim}$ is the first amplitude limit value, $$I_{ltd}^{-}$$

is the regulated second amplitude, Amin is the angular difference.

7. The computer-implemented method of claim 1, wherein:

the first amplitude limit value is a predetermined first amplitude limit value ; and/or the second amplitude limit value is a predetermined second amplitude limit value.

8. The computer-implemented method of claim 1, wherein the power converter comprises a voltage sourced converter 'VSC'.

9. The computer-implemented method of claim 1, wherein the power transmission network is a high voltage direct current 'HVDC' power transmission network.

10. The computer-implemented method of claim 1, wherein the AC network is an AC power grid.

11. The computer-implemented method of claim 1, for use in synchronous grid forming 'SGFM'.

12. A controller for controlling a power converter in the power transmission network, the controller comprising:

a memory; and at least one processor;

wherein the memory comprises computer-readable instructions which when executed by the at least one processor cause the controller to perform the method of claim 1.

13. The power converter for the power transmission network, comprising:

an AC side for electrically connecting to the AC network at a point of connection; and a DC side for electrically connecting to a DC network; and the controller of claim 12.

14. The power transmission network comprising:

the AC network;

the DC network; and the power converter of claim 13, wherein the AC network is connected to the AC side of the power converter and the DC network is connected to the DC side of the power converter.

15. A computer program comprising instructions which when executed by a processor of a controller for the power converter, cause the controller to perform the method of claim 1.

16. The computer-implemented method of claim 1, wherein:

the first amplitude limit value is a maximum instantaneous total current limit for the power converter; and/or the second amplitude limit value is a maximum negative phase sequence current limit for the power converter.

17. The computer-implemented method of claim 1, wherein the power converter comprises a modular multi-level converter 'MMC'.

\* \* \* \* \*